United States Patent
Rust et al.

(10) Patent No.: US 10,412,936 B2
(45) Date of Patent: Sep. 17, 2019

(54) RESILIENT PLATFORM

(71) Applicant: Rose Acre Farms, Inc., Seymour, IN (US)

(72) Inventors: Marcus D. Rust, Remington, IN (US); Robert W. Lewis, North Vernon, IN (US)

(73) Assignee: Rose Acre Farms, Inc., Seymour, IN (US)

(*) Notice: Subject to any disclaimer, the term of this patent is extended or adjusted under 35 U.S.C. 154(b) by 383 days.

(21) Appl. No.: 15/043,279

(22) Filed: Feb. 12, 2016

(65) Prior Publication Data

US 2017/0231201 A1 Aug. 17, 2017

(51) Int. Cl.
*A01K 31/16* (2006.01)
*A01K 31/12* (2006.01)
*A01K 31/00* (2006.01)

(52) U.S. Cl.
CPC .......... *A01K 31/165* (2013.01); *A01K 31/005* (2013.01); *A01K 31/12* (2013.01)

(58) Field of Classification Search
CPC ...... A01K 31/00; A01K 31/16; A01K 31/165; A01K 31/005; A01K 31/12; A01K 31/002; A01K 31/06; A01K 31/07; A01K 31/08; A01K 1/0245
USPC .......................................... 199/337; 119/337
See application file for complete search history.

(56) References Cited

U.S. PATENT DOCUMENTS

| 838,851 | A | 12/1906 | Dropeskey |
|---|---|---|---|
| 1,674,193 | A | 6/1928 | Coltrin |
| 2,096,356 | A | 10/1937 | Fox |
| 2,257,734 | A | 10/1941 | Cornell |
| 2,383,326 | A * | 8/1945 | Lovell ............... A01K 31/04 119/451 |
| 2,565,521 | A | 8/1951 | Ratermann |
| 2,601,844 | A * | 7/1952 | Lovell ............... A01K 31/04 119/458 |
| 2,692,578 | A | 10/1954 | Manning |
| 2,695,006 | A | 11/1954 | Tellefson |
| 2,805,644 | A | 9/1957 | Lieberman |
| 2,882,857 | A | 4/1959 | Ernst et al. |
| 2,956,539 | A | 10/1960 | Boening |
| 2,970,567 | A | 2/1961 | Rubin |
| 3,002,494 | A | 10/1961 | Murray |

(Continued)

FOREIGN PATENT DOCUMENTS

| CH | 662244 A5 | 9/1987 | |
|---|---|---|---|
| DE | 29915229 U1 * | 12/1999 | ............ A01K 31/12 |

(Continued)

OTHER PUBLICATIONS (EP141911765.8) European Patent Office, Written Opinion of the European Search Report, dated Jul. 1, 2015.

(Continued)

*Primary Examiner* — Magdalena Topolski
*Assistant Examiner* — Morgan T Barlow
(74) *Attorney, Agent, or Firm* — Ice Miller LLP

(57) ABSTRACT

An aviary includes a cage and a resilient platform coupled to the cage. The resilient platform is resilient such that movement of a bird on the resilient platform causes the resilient platform to flex and then rebound to loosen a deposit from the resilient platform but not permit the deposit to pass through the resilient platform.

20 Claims, 4 Drawing Sheets

(56) References Cited

U.S. PATENT DOCUMENTS

| | | |
|---|---|---|
| 3,046,940 A | 7/1962 | Kurtz |
| 3,062,185 A | 11/1962 | Kurtz |
| 3,119,375 A | 1/1964 | Ernst |
| 3,124,101 A | 3/1964 | Wierenga, Sr. |
| 3,124,102 A | 3/1964 | Kurtz et al. |
| 3,134,358 A | 5/1964 | Byrnes |
| 3,139,065 A | 6/1964 | Willauer, Jr. |
| 3,164,129 A | 1/1965 | Rigterink |
| 3,208,430 A | 9/1965 | Ernst |
| 3,242,904 A | 3/1966 | Rannou |
| 3,274,973 A | 9/1966 | Woods et al. |
| 3,312,194 A | 4/1967 | Ernst |
| 3,319,606 A | 5/1967 | Virgil |
| 3,339,528 A | 9/1967 | Summerour |
| 3,355,037 A | 11/1967 | Dodd |
| 3,464,389 A | 9/1969 | Seiderman |
| 3,485,214 A | 12/1969 | Burkholder |
| 3,552,359 A | 1/1971 | Graves et al. |
| 3,581,709 A | 6/1971 | Van Huis et al. |
| 3,768,442 A * | 10/1973 | Van Huis ............... A01K 31/17 119/440 |
| 3,783,829 A * | 1/1974 | Siciliano ............... A01K 31/17 119/455 |
| 3,791,348 A | 2/1974 | Marnett |
| 3,796,189 A | 3/1974 | Blondeel |
| 3,810,444 A * | 5/1974 | Conley ................. A01K 31/04 119/442 |
| 3,867,903 A | 2/1975 | Fleshman |
| 3,892,201 A | 7/1975 | Crawford |
| 3,976,032 A | 8/1976 | Ramser et al. |
| 3,978,819 A | 9/1976 | Lovitt |
| 4,008,690 A | 2/1977 | Van Huis |
| 4,011,837 A | 3/1977 | Ksioszk |
| 4,020,793 A | 5/1977 | Morrison |
| 4,023,531 A | 5/1977 | Thompson |
| 4,188,911 A | 2/1980 | Rafaely |
| 4,235,199 A * | 11/1980 | Kuhlmann ........... A01K 31/165 119/337 |
| 4,242,809 A * | 1/1981 | Elder ................... A01K 31/04 119/442 |
| 4,250,837 A | 2/1981 | Cocklereece |
| 4,315,481 A | 2/1982 | Coile et al. |
| 4,321,887 A | 3/1982 | Martin et al. |
| 4,379,439 A | 4/1983 | Baur |
| 4,416,219 A | 11/1983 | Dill |
| 4,430,960 A | 2/1984 | Nagel et al. |
| 4,437,433 A | 3/1984 | Nijhof |
| 4,474,137 A | 10/1984 | Walters |
| 4,480,588 A | 11/1984 | Holladay et al. |
| 4,489,675 A * | 12/1984 | Siciliano ............... A01K 31/04 119/442 |
| 4,653,430 A | 3/1987 | Mass et al. |
| 4,697,547 A * | 10/1987 | Malestein ............. A01K 1/03 119/457 |
| 4,766,849 A | 8/1988 | Kawabata et al. |
| 4,841,909 A | 6/1989 | Siciliano |
| 4,936,257 A | 6/1990 | Kuhlmann |
| 5,058,530 A * | 10/1991 | Van De Ven ......... A01K 31/16 119/337 |
| 5,094,186 A | 3/1992 | Andersen |
| 5,143,021 A * | 9/1992 | Shaley ................. A01K 31/10 119/330 |
| 5,174,242 A | 12/1992 | Takeuchi |
| 5,279,254 A | 1/1994 | Dowty |
| 5,570,657 A | 11/1996 | Kuhlmann |
| 5,596,949 A | 1/1997 | Fanguy |
| 5,662,068 A | 9/1997 | Childs |
| 5,666,905 A | 9/1997 | Mackin et al. |
| 5,897,285 A | 4/1999 | Wanderscheid |
| 5,901,665 A * | 5/1999 | Lackner ............... A01K 31/04 119/458 |
| 6,234,114 B1 | 5/2001 | Dyer |
| 6,286,456 B1 | 9/2001 | Michaelis |
| 6,394,031 B1 | 5/2002 | Moller |
| 6,412,439 B1 | 7/2002 | Otto-Lubker et al. |
| 6,598,562 B1 | 7/2003 | Dutkiewicz et al. |
| 6,688,835 B1 | 2/2004 | Buher |
| 6,968,807 B2 | 11/2005 | Kuhlmann |
| 7,350,364 B2 | 4/2008 | Meerpohl |
| 7,827,938 B2 | 11/2010 | Kuehlmann |
| 8,117,994 B1 | 2/2012 | Goodlow |
| 9,538,731 B2 * | 1/2017 | Rust ..................... A01K 31/165 |
| 2004/0144326 A1 | 7/2004 | Smith |
| 2004/0144329 A1 | 7/2004 | Kuhlmann |
| 2008/0173250 A1 | 7/2008 | Dowty |
| 2009/0084323 A1 | 4/2009 | Tsubai |
| 2009/0107801 A1 * | 4/2009 | Smith ................. A01K 31/165 198/369.2 |
| 2010/0192869 A1 * | 8/2010 | Rose ..................... A01K 1/03 119/491 |
| 2013/0047930 A1 * | 2/2013 | Risser ................. A01K 31/005 119/450 |
| 2015/0122190 A1 | 5/2015 | Rust et al. |
| 2015/0122191 A1 | 5/2015 | Rust et al. |
| 2015/0122192 A1 | 5/2015 | Rust et al. |
| 2015/0122193 A1 | 5/2015 | Rust et al. |
| 2015/0122195 A1 | 5/2015 | Rust et al. |
| 2015/0126105 A1 | 5/2015 | Rust et al. |
| 2015/0230432 A1 | 8/2015 | Rust et al. |
| 2015/0230433 A1 | 8/2015 | Dart |
| 2015/0264894 A1 * | 9/2015 | Rust ..................... A01K 31/165 119/335 |
| 2018/0007870 A1 * | 1/2018 | Finco ..................... A01K 31/22 |

FOREIGN PATENT DOCUMENTS

| | | | |
|---|---|---|---|
| DE | 20317631 U1 | 4/2004 | |
| EP | 0904690 A1 | 3/1999 | |
| EP | 1477057 A1 * | 11/2004 | ............ A01K 31/16 |
| EP | 1477057 A1 | 11/2004 | |
| EP | 2 878 195 A2 | 6/2015 | |
| FR | 2595540 A1 * | 9/1987 | ............ A01K 31/12 |
| GB | 332737 A * | 7/1930 | ............ A01K 31/12 |
| GB | 974616 A * | 11/1964 | .......... A01K 31/165 |
| JP | 8172965 | 7/1996 | |
| JP | 8172966 | 7/1996 | |
| WO | WO 2016/062701 A1 | 4/2016 | |

OTHER PUBLICATIONS

TH.G.C.M. Fiks-Van Niekerk, B.F.J. Reuvekamp, R.A. Van Emous, M.A.W. Ruis, "Praktijk Rapport Pluimvee 6, Systeem van de toekomst voor leghennen", Praktijkonderzoek Veehouderij, Wageningen UR, Mar. 2003, Lelystad.

TH.G.C.M. Fiks-Van Niekerk, B.F.J. Reuvekamp, R.A. Van Emous, M.A.W. Ruis, "Research Report Poultry 6, System of the Future for Laying Hens", Institute for Animal Husbandry, Wageningen UR, Mar. 2003, Lelystad, English Translation.

First Examination Report, Systems and Methods for an Aviary, IP No. 701660, New Zealand Intellectual Property Office, dated Oct. 14, 2016.

"Massive Investment in Scottish Barn Egg Production" The Poultry Site (Feb. 20, 2014).

"A 2-tier coop for laying hens" Karl-Ludwig Borchert, Braunschweig-Völkenrode (1985), XP002065271, English Translation.

"Alternatieve huisvesting voor leghennen" Ing. A. Cappon, C. ter Beek, W.F. Frederiks, and ir. J.A.M. Voermans (Jun. 1986), XP55194182.

"Alternative housing for laying hens" Ing. A. Cappon, C. ter Beek, W.F. Frederiks, and ir. J.A.M. Voermans (Jun. 1986), XP55194182, English Translation.

Big Dutchman, NATURA60 & NATURA70 The Modern aviaries for barn and free range egg productions, product brochure, Mar. 2010.

Agricultural Mfg. & Textiles, Inc., FingerBelt Laced With Fingers, Internet article, May 16, 2006, Agricultural Mgf. & Textiles, Inc.

Big Dutchman, Egg Production Photos, Internet Article.

Big Dutchman, The Modern Aviary for Layers in Floor Management, Internet Article, Sep. 12, 2012-Aug. 13, 2013.

(56) References Cited

OTHER PUBLICATIONS

Big Dutchman, NATURA70: Flexible, efficient and profitable, Internet article, Sep. 12, 2012-Aug. 13, 2013.
Big Dutchman, Group Laying Nest for Optimum Egg Quality, Internet article, Sep. 12, 2012-Aug. 13, 2013.
Poultry times.net, CSES Research Examines Worker Health, Internet newspaper article, Oct. 4, 2013.
Potters Poultry International, Aviary, product brochure.
Vencomatic Group, Bolegg Terrace, product brochure.
"Het etagesysteem voor leghennen; Ontwikkeling en toetsing van een volieresysteem voor leghennen" (1980-1987), Dec. 1, 1987 (Dec. 1, 1987), XP055195185, Netherlands.
"Tiered Floor System for Laying Hens—development and testing of a henhouse system for laying hens" (1980-1987), Dec. 1, 1987 (Dec. 1, 1987) XP055195185, Netherlands, English Translation.

\* cited by examiner

RESILIENT PLATFORM

TECHNICAL FIELD OF THE DISCLOSED EMBODIMENTS

The embodiments herein generally relate to aviaries and, more particularly, to aviary cages having egg-saving and self-cleaning resilient platforms.

BACKGROUND OF THE DISCLOSED EMBODIMENTS

Aviary cages are frequently used to house hens for egg production. Generally, the aviary cage includes nesting areas where the eggs are laid. The eggs are then carried from the nesting area to a collection area by an egg conveyor that is positioned adjacent the nesting area. Recently, the need to provide hens with an area to walk around and peck and scratch has increased dramatically as more farms are producing "cage free" product. "Cage free" indicates that the hens are not confined within cages.

Some aviaries include cage towers having perches extending therefrom. The perches provide additional space for hens to roost and may meet the requirements for the aviary to be considered cage free. Generally, the perches are positioned near a nesting area where the hens lay eggs. An egg collector may be positioned nearby to collect the eggs that are laid by the hens in the nesting area. A cover may be positioned over the egg collector to prevent the hens from stepping on any eggs gathered in the egg collector. Unfortunately, many eggs laid while the hens are roosting on the cover or the perch fall from the cage tower and crack on the ground below, are eaten by the birds, or become contaminated, which over time can lead to significant losses in earnings for egg producers.

Another problem is that manure and other detritus accumulates in these areas. This has resulted in increased harmful ammonia contamination within some aviaries. It has also increased the requirements for manual cleaning of these areas. Although the perches and egg collector covers provide some space for hens to roost, such spaces provide limited areas for the birds to engage in natural activities.

A need remains for an aviary that includes additional space, such as platforms, for birds to land, walk, scratch, and/or roost on that will help preserve eggs and facilitate self-cleaning of manure that accumulates in such areas.

SUMMARY OF THE DISCLOSED EMBODIMENTS

In one embodiment, an aviary is provided, wherein the aviary includes a cage. A resilient platform is positioned adjacent to the cage. In an embodiment, a perch is positioned adjacent to the resilient platform. Other embodiments are also disclosed.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein.

DETAILED DESCRIPTION OF THE DISCLOSED EMBODIMENTS

Figure 1:
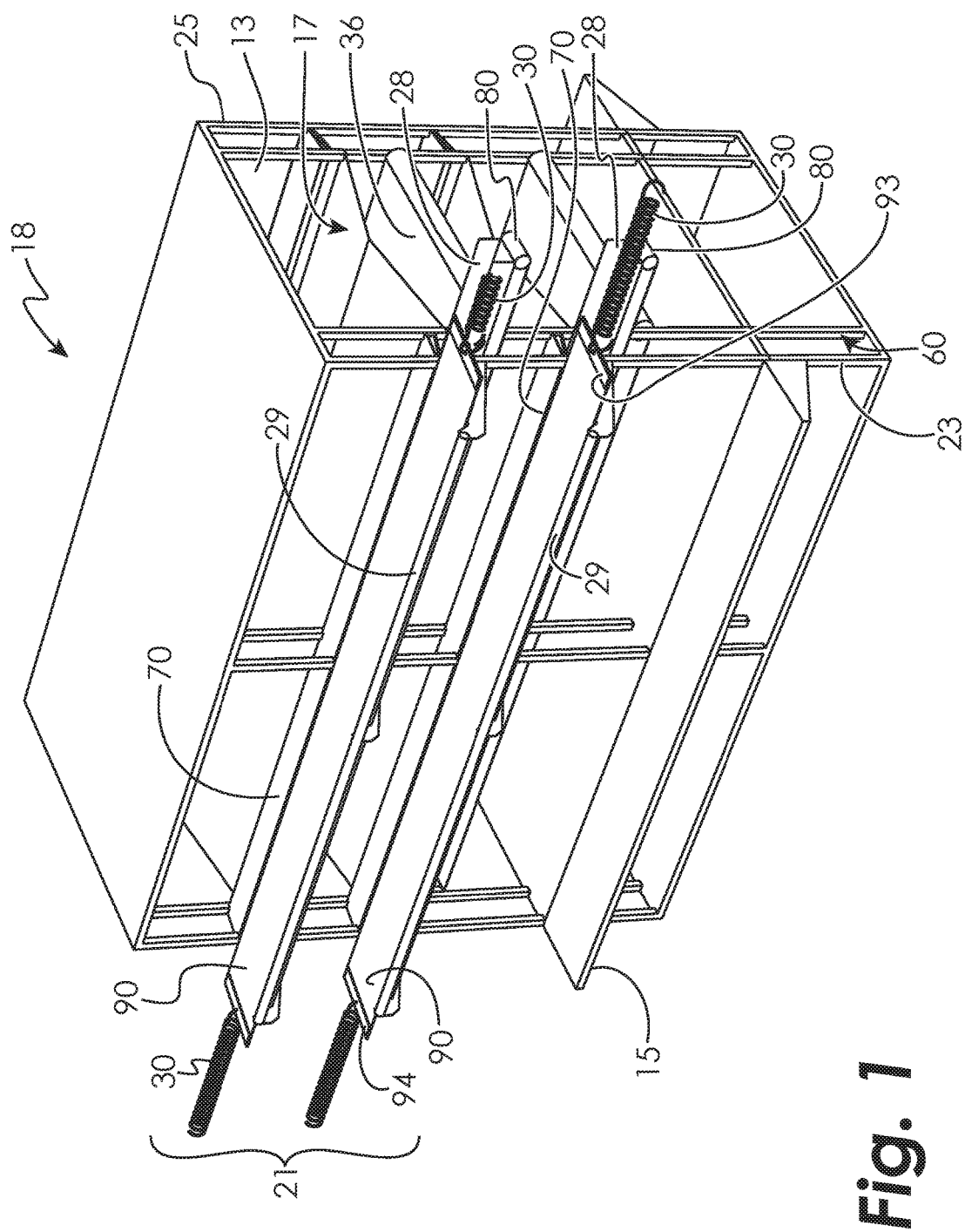
FIG. 1 is a side perspective view of a cage tower formed in accordance with an embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The present embodiments provide aviaries having open space that may include a floor or platform serving as a pecking area where hens can move freely, peck with their beaks, and scratch with their feet. By permitting space for the hens to move freely, the aviary cages of the present embodiments satisfy the requirements to be considered "cage free" for birds. See http://en.wikipedia.org/wiki/Cage-free. In other words, the hens are not continuously confined to a caged area. The present embodiments facilitate the removal of freshly laid eggs, which eggs may be sold under the label "cage free" because the birds live in a cage free environment. The present embodiments also prevent eggs from becoming contaminated or eaten due to slow retrieval thereof from the scratching areas or cage floors (during which time the eggs could be infiltrated by bacteria).

Embodiments disclosed herein may be used with any of the aviaries disclosed in U.S. Patent Application Publication Nos. 2015/0122191, 2015/0230432, 2015/0230433, 2015/0264894, and 2015/0122192 and with other aviary designs that facilitate cage free housing for birds. It should be noted that the various elements of each of the embodiments described below may be combined in any manner to form new embodiments of an aviary.

Figure 2:
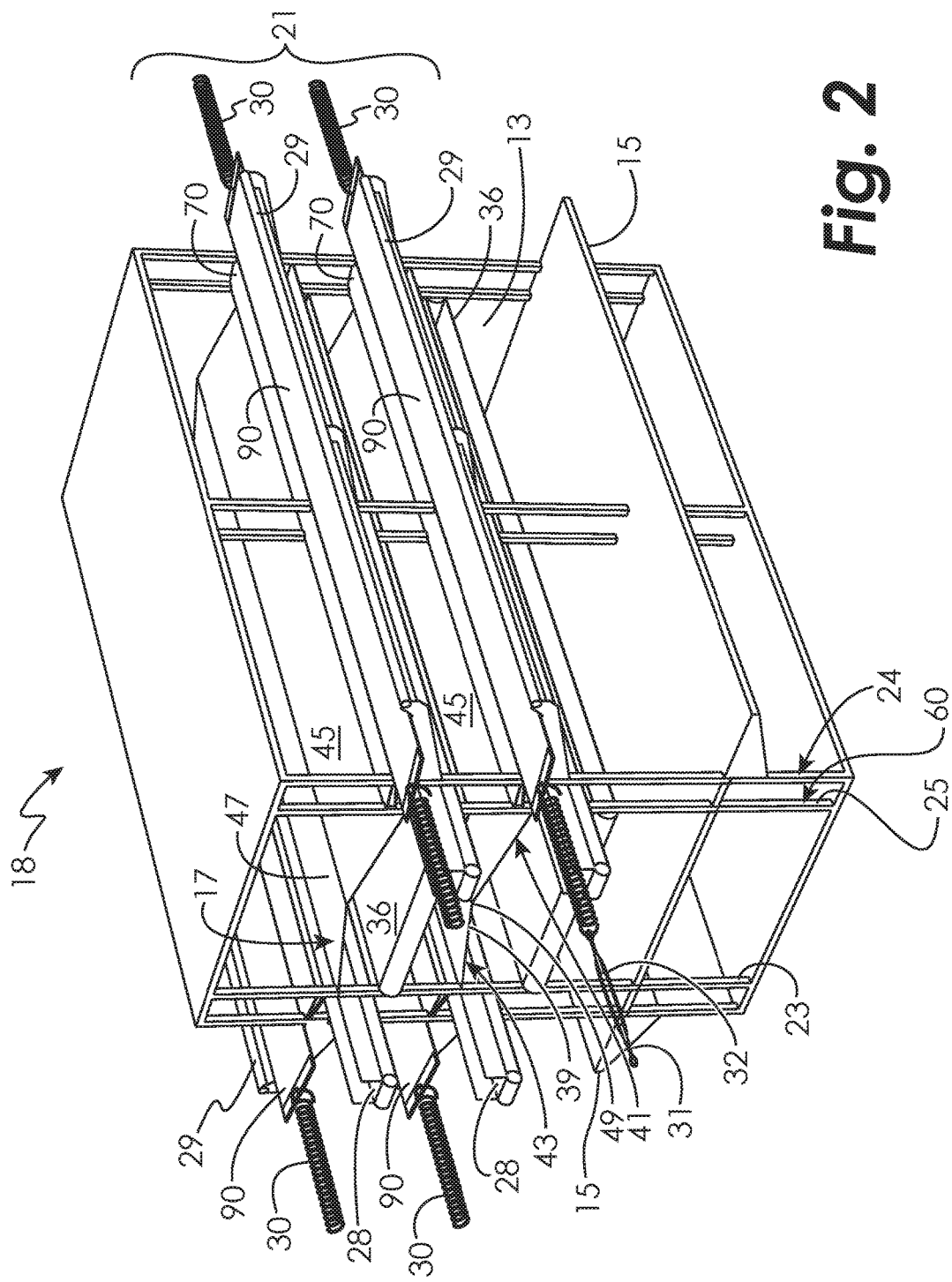
FIG. 2 is a side perspective view of a cage tower formed in accordance with an embodiment.

FIGS. 1 and 2 illustrate a cage tower 18 formed in accordance with an embodiment of the present disclosure. The cage tower includes an outside surface 60. The cage tower 18 includes at least one aviary cage 21. Each aviary cage 21 includes an outside surface 60, a first side 25, and a second side 23 enclosing an inside area 13. At least one bump rail 15 extends from each of the first side 25 and the second side 23 and into the respective aisle (not shown) to allow equipment to be maneuvered through the aisle without damaging the at least one cage tower 18 or the at least one aviary cage 21. The bump rail 15 may be used by the birds as a perch.

The inside area 13 provides space where a hen may visit to perform any of several different tasks, including, but not limited to, feeding, drinking, sitting to lay eggs, socializing with other hens, and scratching eggs or manure with their feet. As the hens lay their eggs, the eggs roll by gravity or are scratched by the hens over to an egg collector 28, which egg collector 28 is adjacent the outside surface 60. In an embodiment, the aviary cage 21 comprises at least two egg collectors 28 that extend along the sides 25 and 23 of the aviary cage 21. In an embodiment, the egg collector 28 is coupled to the cage tower 18. The egg collector 28 may include a conveyor 80 that carries the eggs from the inside area 13 to a collection area (not shown). Alternatively, the eggs may be manually collected from the egg collector 28.

Each inside area 13 includes at least one nesting area 17. The nesting area 17 provides space where a hen may sit to lay eggs. As the hens lay their eggs, the eggs are collected in an egg collector 28 because the nesting area 17 is sloped to facilitate gravity feed of the eggs to the egg collector 28. In an embodiment, the aviary cage 21 comprises two egg collectors 28, one egg collector 28 that extends along the side 25 and one that extends along the side 23 of the aviary cage 21. The egg collectors 28 may include conveyors 80 that carry the eggs from the nesting area 17 to a collection area (not shown).

At least one belt 36 extends through the cage tower 18 to remove a deposit from at least part of the cage tower 18. A deposit may include, but is not limited to, one or more items such as manure, an egg, litter, feathers, feed, or a dead bird to name a few. In one embodiment, a plurality of belts 36 extends through the cage tower 18 to remove deposits from at least part of the tower 18. The plurality of belts 36 are positioned at various vertical locations within each cage tower 18. At least one belt 36 of the plurality of belts 36 is positioned below the nesting area 17 of each aviary cage 21. In an embodiment, additional belts 36 of the plurality of belts 36 extend through the inside area 13 of each aviary cage 21.

In one embodiment, at least one belt 36 extends through the cage tower 18 substantially the length of the cage tower 18. In one embodiment, the belt 36 extends approximately 400 feet along the length of the cage tower 18. In one embodiment, the belt 36 carries a deposit from the cage tower 18 to a collection area (not shown) positioned outside of the cage tower 18.

Additionally, the need for an individual to enter the cage and clean the cage by hand is greatly reduced. Accordingly, the present embodiments permit one person to care for 150,000 to 200,000 birds, compared with the 3-5 people per 150,000 to 200,000 birds required when known cages and aviaries are used. The present embodiments also eliminate the requirement for extreme body positions, including squatting for extended periods of time and crawling and lying on the floor while loading and unloading the cage and while gathering eggs from the cage. The present embodiments further reduce potential respiratory hazards and infection hazards to the workers. If a hen lays an egg outside of the nesting area 17, the egg may be collected by a belt 36 or a conveyor 80 and carried to an egg collection area (not shown) positioned outside of the cage tower 18.

In one embodiment, a grate 39 is positioned over the belt 36. The grate 39 includes openings therethrough (not shown) that allow deposits, but not eggs, to pass through the grate 39 to the belt 36. Because it is common for the birds to defecate on the grate 39, the manure may pass or be scratched by the birds through the openings of the grate 39 and onto the belt 36, which is in the direction of arrow C (shown in FIG. 4), to be carried from the cage tower 18 to a collection area (not shown) positioned outside of the cage tower 18.

FIG. 2 also illustrates the inside area 13 of an aviary cage formed in accordance with an embodiment. The grate 39 has a first end 41 and a second end 43. The first end 41 extends to the first side 25 of the aviary cage 21. The second end 43 extends to the second side 23 of the aviary cage 21. In one embodiment (not shown), the grate 39 is flat. In one embodiment, the grate 39 is shaped so that it is sloped toward each end 41 and 43. Each end 41, 43 of the grate 39 is positioned adjacent to an egg collector 28. In one embodiment, the egg collectors 28 may include conveyors 80 that carry the eggs from the aviary cage 21 to a collection area (not shown).

In one embodiment, a first portion 45 of the grate 39 is sloped downward toward an egg collector 28 positioned adjacent to the first end 41 of the grate 39. In this embodiment, a second portion 47 of the grate 39 is sloped downward toward an egg collector 28 positioned adjacent to the second end 43 of the grate 39. In one embodiment, the first portion 45 and second portion 47 of the grate 39 each extend from a centerline 49 of the grate 39. In one embodiment, the first portion 45 and the second portion 47 are sloped from the centerline 49 at approximately a 7° to 8° angle. Eggs laid on the second portion 47 of grate 39 roll by gravity or are scratched by the hens to the respective egg collector 28 adjacent to the second end 43 of the grate 39, which is in the direction of arrow A (shown in FIG. 4). Eggs laid on the first portion 45 of the grate 39 roll by gravity or are scratched by the hens to the respective egg collector 28 adjacent to the first end 41 of the grate 39. In one embodiment (not shown) in which the grate 39 is flat, the hens scratch the eggs to an egg collector 28.

In one embodiment, at least one perch 29 extends outward from a respective bracket 27. In one embodiment, the at least one perch 29 is positioned adjacent to and at a greater height from the floor (not shown) than a respective egg collector 28. In one embodiment, the at least one perch 29 is solid. In one embodiment, the perch 29 may be square. In one embodiment, the perch 29 may be round. In one embodiment, a square perch 29 may have a width of ¾ inches to 2 inches. In one embodiment, a round perch 29 may have a diameter of ¾ inches to 2 inches. The width or diameter of the perch 29 is configured to allow a hen to stand on the perch 29. In one embodiment, the perch 29 may extend a portion of the length of the respective cage tower 18. In one embodiment, the perch 29 may extend substantially the length of the respective cage tower 18.

In one embodiment, a cover 70 extends from the outside surface 60 and is positioned over the egg collector 28. In one embodiment, the cover 70 is positioned adjacent to the inside area 13. In one embodiment (not shown), the cover 70 is sloped downward toward the outside surface 60. In one embodiment, the cover 70 is sloped upward toward the outside surface 60. In one embodiment, hens within the inside area 13 may move from the inside area 13 onto the cover 70.

In one embodiment, the cover 70 is configured to permit hens to walk, land, scratch, or roost on the cover 70. In one embodiment shown in FIG. 3, the cover 70 includes a scratching surface 72 that enables the hens to scratch and peck on the cover 70. The cover 70 is positioned over the egg collector 28 to prevent hens from stepping on and damaging any eggs within the egg collector 28. In one embodiment, the cover 70 is movable relative to its position over the egg collector 28 so that eggs within the egg collector 28 may be manually removed. In one embodiment, the cover 70 is movable relative to its position over the egg collector 28 so that deposits may be directed toward the grate 39. In one embodiment in which the egg collector 28 does not include an egg conveyor 80, the cover 70 may be moved or removed to permit manual collection of the eggs in the egg collector 28 by a worker. In one embodiment including an egg conveyor 80, the cover 70 may be moved or removed to permit a worker to access deposits that are stuck on the egg conveyor 80 or to perform maintenance on the egg conveyor 80. In one embodiment, the grate 39 is positioned inside the cage tower 18 adjacent to the cover 70.

In one embodiment, a resilient platform 90 is positioned adjacent to the cage tower 18. In one embodiment, a resilient platform 90 is positioned adjacent to the aviary cage 21. In one embodiment, a resilient platform 90 is positioned adjacent to the outside surface 60. In one embodiment, a resilient platform 90 is positioned adjacent to the cover 70. In one embodiment not including the cover 70 (not shown), the resilient platform 90 is positioned over the egg collector 28. In one embodiment, the resilient platform 90 is positioned adjacent to the inside area 13. In one embodiment, the resilient platform 90 is sloped downward toward the outside surface 60 of the cage tower 18.

The resilient platform 90 includes a first end 93 and a second end 94. In one embodiment, the resiliency of the resilient platform 90 is facilitated by a flexible or resilient support structure (not shown). In one embodiment, the resilient platform 90 is spaced above the respective bracket 27 to facilitate resiliency by permitting space for the resilient platform 90 to move relative to the bracket 27.

In one embodiment (not shown), the first end 93 of the resilient platform 90 includes a fastening member. In one embodiment (not shown), the second end 94 of the resilient platform 90 includes a fastening member. In one embodiment, the first end 93 and the second end 94 of the resilient platform 90 each include a fastening member. In embodiments in which the resilient platform 90 is positioned by means of attaching it at one or both ends to a wall (not shown), a support (not shown), the cage tower 18, the aviary cage 21, or another attachment point (not shown), the fastening member connects the resilient platform 90 to an attachment point (not shown) in order to maintain it in a relatively planar configuration suitable for use by birds.

Those of ordinary skill will understand from the present disclosure that the fastening member may comprise any material and any device capable of securing the resilient platform 90 in relation to the outside surface 60 and permitting or facilitating resiliency, depending on the nature of the material from which the resilient platform 90 is made and therefore the inherent resiliency of the resilient platform 90 itself, in the resilient platform 90. Such materials may include but are not limited to plastic, rubber, fiber, metal, and combinations thereof. Such devices may include but are not limited to a brace, spring, rope, cable, wire, rod, beam, turnbuckle, eyebolt, hook, rivet, glue, weld, cord, and combinations thereof. When the material comprising the fastening member is resilient, the resiliency of the resilient platform 90 is either facilitated or enhanced, depending on the material or materials comprising the resilient platform 90. When the device chosen for the fastening member is resilient, the resiliency of the resilient platform 90 is either facilitated or enhanced, depending on the material or materials comprising the resilient platform 90.

In an embodiment, the fastening member may be formed integrally with the resilient platform 90. In an embodiment, the fastening member may be attached to the resilient platform 90. These exemplary embodiments illustrate only a few of the fastening members that can be utilized in accordance with the present disclosure. One of ordinary skill will understand from the present disclosure that any number of suitable fastening members may be used alone or in combination in accordance with the present disclosure.

In one embodiment (not shown), the fastening member at the first end 93 of the resilient platform 90 comprises a turnbuckle 32 and an eyebolt 31. In one embodiment (not shown), the fastening member at the second end 94 of the resilient platform 90 comprises a turnbuckle 32 and an eyebolt 31. In one embodiment, the fastening member at the first end 93 and the fastening member at the second end 94 of the resilient platform 90 each comprise a spring 30. In one embodiment shown in FIG. 2, the fastening member attached to the resilient platform 90 comprises a spring 30 attached to a turnbuckle 32, which turnbuckle 32 is then attached to an eyebolt 31.

In view of the present disclosure, those of ordinary skill in the art will understand that the resilient platform 90 may comprise any material capable of displaying resilient characteristics when touched by a bird, including but not limited to plastic, metal, mesh, fiber, rubber, combinations thereof, and the like. When a resilient platform 90 is combined with a fastening member that permits the resilient platform 90 to move and thereby become resilient, then the material used for the resilient platform itself could be a less resilient material. When a resilient platform 90 is combined with a fastening member that does not permit the resilient platform 90 to move very much, then the material used for the resilient platform 90 must itself be a more resilient material.

Similarly, when a resilient platform 90 is combined with a resilient support structure that permits the resilient platform 90 to move and thereby become resilient, then the material used for the resilient platform itself could be a less resilient material. When a resilient platform 90 is combined with a non-resilient support structure, then the material used for the resilient platform 90 must itself be a more resilient material to facilitate the self-cleaning feature of the resilient platform 90.

In an embodiment, the resilient platform 90 comprises plastic and the fastening member is a spring 30. One of ordinary skill will understand that other suitable materials may be used in accordance with the present disclosure.

In one embodiment, the resilient platform 90 is sloped toward the cover 70. In one embodiment (not shown), the resilient platform 90 is sloped away from the cover 70. In one embodiment, hens within the inside area 13 may move from the inside area 13, across the cover 70, and onto the resilient platform 90. In one embodiment, hens within the inside area 13 may move from the inside area 13 and onto the resilient platform 90. In one embodiment, hens may move from an adjacent cage tower 18 onto the resilient platform 90. In one embodiment, hens may move from a perch 29 onto the resilient platform 90. In one embodiment, hens may land on the resilient platform 90 after hopping from another location in the aviary. The resilient platform 90 is configured to permit hens to walk, land, scratch, or roost on the resilient platform 90. As will be appreciated by one of skill in the art from the present disclosure, the resiliency of the resilient platform 90 allows the resilient platform 90 to rebound or spring back into its position previous to the movement after being moved by birds walking, landing, scratching, or roosting on the resilient platform 90.

In one embodiment, the resilient platform 90 is positioned parallel to the plane of the cover 70. In one embodiment, the resilient platform 90 is positioned adjacent to and above the grate 39. In one embodiment (not shown), the resilient platform 90 is positioned above the cover 70. In one embodiment (not shown), the resilient platform 90 is positioned below the cover 70. In one embodiment, the resilient platform 90 overlaps the cover 70. In one embodiment, the resilient platform 90 overlaps and touches the cover 70. In one embodiment, the resilient platform 90 includes a scratching surface 92 on which the birds may scratch and peck. In one embodiment, the resilient platform 90 is moveable. In one embodiment, the resilient platform 90 may be removed to permit a worker to perform any necessary maintenance.

In one embodiment, a support structure 24 may be positioned between the resilient platform 90 and the cover 70. In one embodiment, the respective bracket 27 extends outward from a support structure 24. In one embodiment, a perch 29 extends outward from a respective bracket 27, the respective bracket 27 extending outward from a support structure 24. In one embodiment, the respective bracket 27 extends outward from the outside surface 60. In one embodiment, a perch 29 extends outward from a respective bracket 27, the respective bracket 27 extending outward from the outside surface 60.

Figure 3:
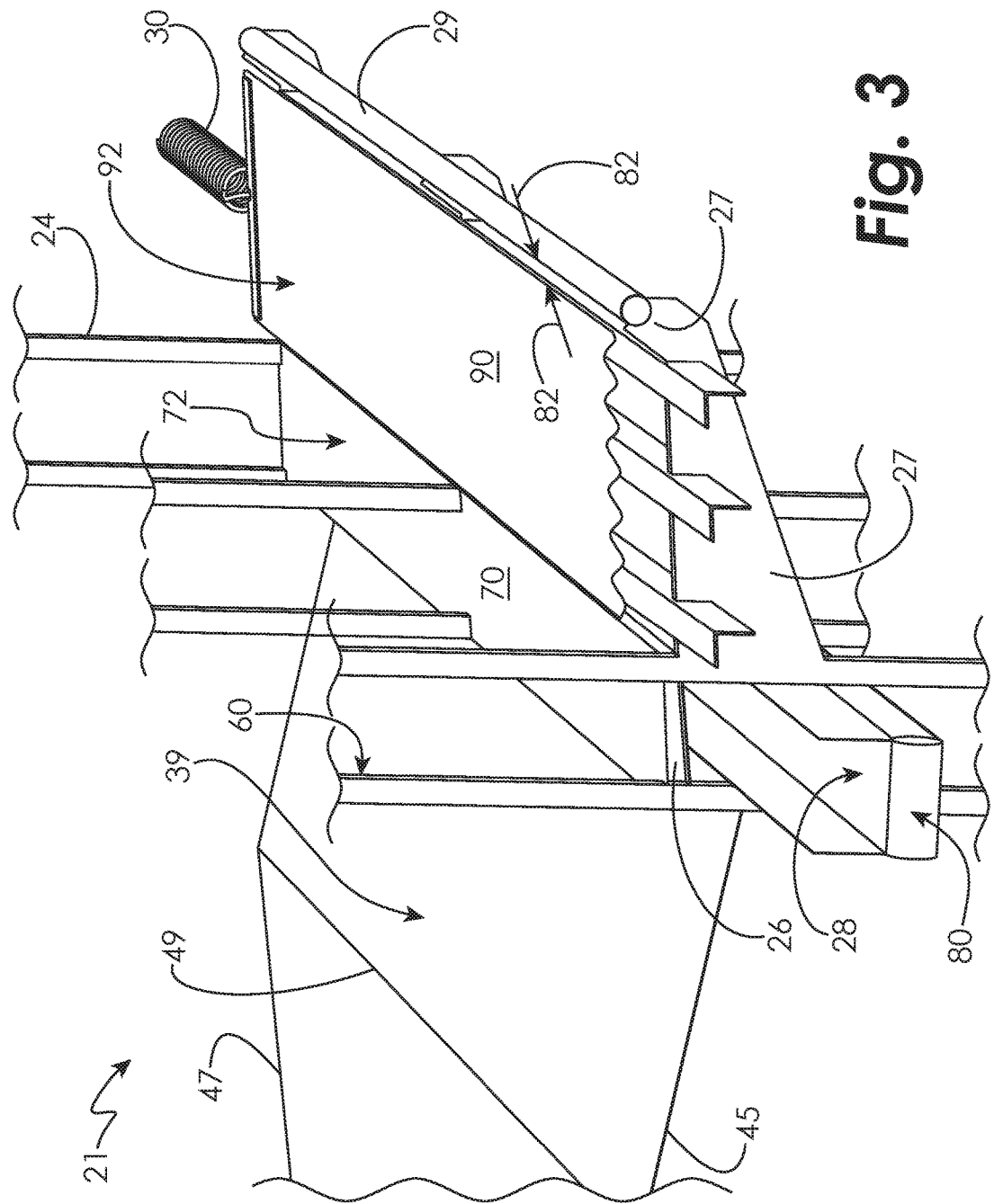
FIG. 3 is a perspective view of a perch, a resilient platform, a cover, a grate, and an egg collector formed in accordance with an embodiment.

FIG. 3 illustrates the perch 29, the resilient platform 90, the cover 70, the grate 39, and the egg collector 28 formed in accordance with an embodiment. In one embodiment, the perch 29 extends from the support structure 24. In one embodiment, the egg collector 28 and cover 70 extend between the outside surface 60 and the support structure 24. Those of skill in the art will recognize that the combination of the perch 29, egg collector 28, cover 70, and resilient platform 90 may be repeated as many times as desired about the outside surface 60 of the cage tower 18 or the support structure 24 to achieve the desired amount of egg collection capability and perching and scratching space for the birds.

In one embodiment, the cover 70 is supported by at least one bracket 26 extending outward into the aisle (not shown) from the outside surface 60. In one embodiment (not shown), the at least one bracket 26 is continuous with the respective bracket 27. In one embodiment (not shown), the cover 70 extends from the egg collector 28. In one embodiment, the resilient platform 90 is positioned adjacent to the cover 70. In one embodiment, the perch 29 extends from the egg collector 28. In one embodiment, the perch 29 is positioned adjacent to the resilient platform 90. In one embodiment, the perch 29 is positioned at a greater height relative to the floor (not shown) than the resilient platform 90.

In one embodiment, a gap 82 is formed between the perch 29 and the resilient platform 90. The gap 82 is sized to capture eggs laid on the resilient platform 90 or while a hen roosts on the perch 29. In particular, eggs laid on the resilient platform 90 or while the hen roosts on the perch 29 are prevented from rolling through the gap 82 between the perch 29 and the resilient platform 90 into the aisle (not shown). In one embodiment, the gap 82 is sized to prevent eggs of any size from rolling off the resilient platform 90 into the aisle (not shown). In one embodiment, the gap 82 is sized to prevent medium eggs and larger eggs from rolling off the resilient platform 90. The person of skill in the art will recognize that the gap 82 may be sized to selectively preserve eggs of a desired size and larger from damage due to rolling into the aisle (not shown) and falling onto a scratching floor 11 or the floor (not shown). Eggs captured by the gap 82 are accessible from the aisle (not shown) and may be collected manually or may be scratched by a bird back toward the grate 39 in the direction of arrow B in FIG. 4. In one embodiment, the perch 29 and the resilient platform 90 may be sloped so that eggs captured by the gap 82 roll toward an end of the cage tower 18.

Figure 4:
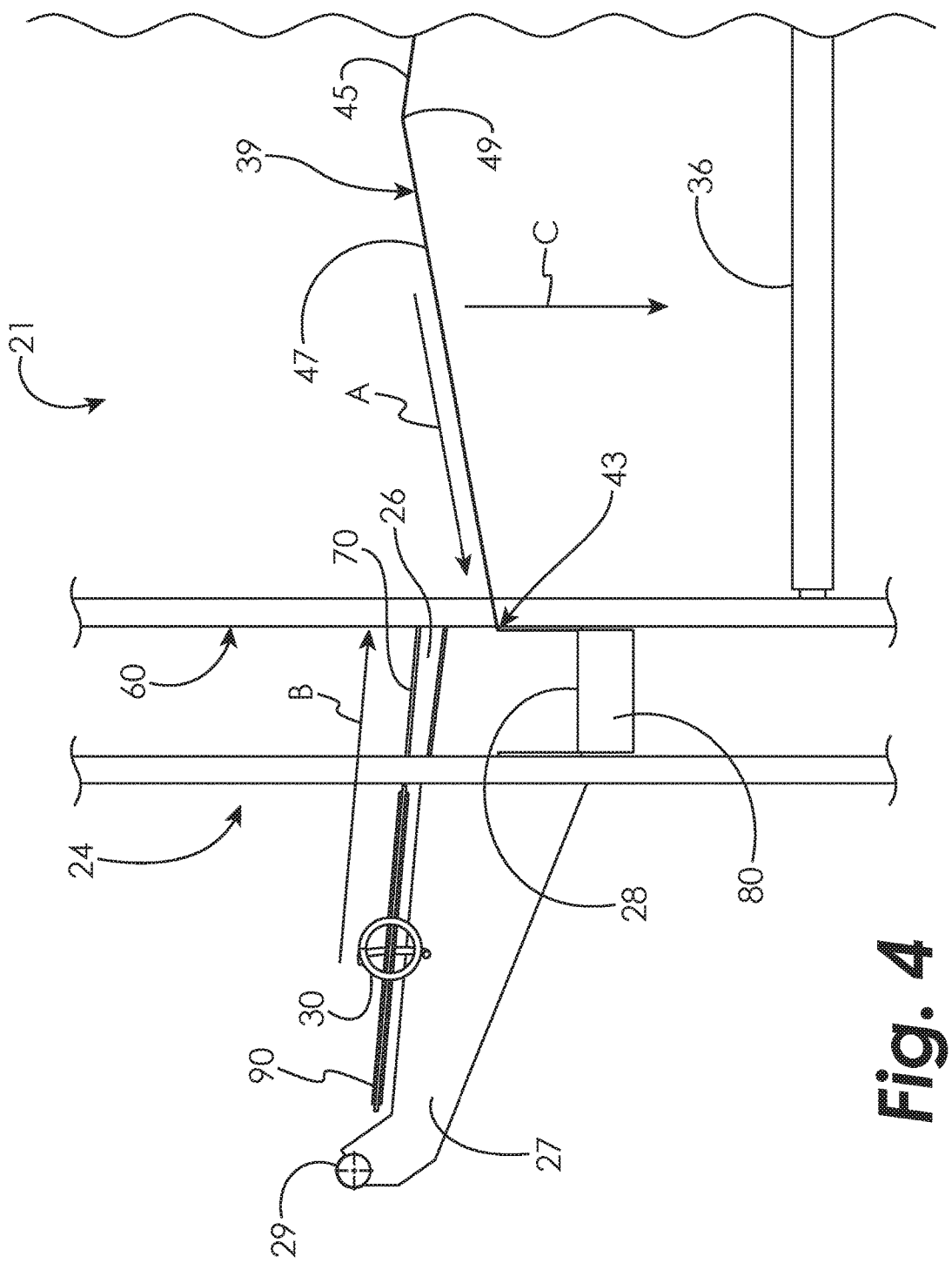
FIG. 4 is an end view of a resilient platform, a perch, a cover, a grate, an egg collector, and a belt formed in accordance with an embodiment.

FIG. 4 illustrates how the resilient platform 90 directs deposits away from the resilient platform 90 to a collection area (not shown) in accordance with an embodiment. In one embodiment, a bird may sit on the perch 29 or the resilient platform 90 to lay eggs, socialize with other birds, or rest, to name a few non-limiting bird activities. In one embodiment in which a hen lays eggs and the resilient platform 90 is sloped toward the grate 39, the eggs laid on the resilient platform 90 and/or the eggs laid while a hen sits on the perch 29 that are not captured in the gap 82 roll by gravity or scratching by the hens to the grate 39, which is in the direction of arrow B.

In one embodiment, the flexibility of the resilient platform 90 itself allows the resilient platform 90 to rebound or spring back into its position previous to the movement after being moved by birds walking, landing, scratching, or roosting on the resilient platform 90. In one embodiment, the flexibility imparted to the resilient platform 90 by the flexible support structure (not shown) allows the resilient platform 90 to rebound or spring back into its position previous to the movement after being moved by birds walking, landing, scratching, or roosting on the resilient platform 90. In one embodiment, the flexibility imparted to the resilient platform 90 by the fastening member allows the resilient platform 90 to rebound or spring back into its position previous to the movement after being moved by birds walking, landing, scratching, or roosting on the resilient platform 90.

In one embodiment in which the fastening member is a spring 30, the spring loading of the resilient platform 90 can also allow the resilient platform 90 to rebound or spring back into shape after being moved by hens walking, landing, scratching, or roosting on the resilient platform 90. In one embodiment, the flexibility of the resilient platform 90 itself combined with a resilient fastening member at each end 93, 94 of the resilient platform 90 enhances the rebounding action of the resilient platform 90 being moved by hens walking, landing, scratching, or roosting on the resilient platform 90.

In one embodiment in which the cover 70 is sloped downward toward the grate 39, the eggs that roll by gravity or scratching by the hens to the grate 39 from the resilient platform 90 roll in the direction of arrow B onto the grate 39. In one embodiment in which a second portion 47 of the grate 39 is sloped downward toward an egg collector 28 positioned adjacent to the second end 43 of the grate 39, the eggs that roll onto the second portion 47 of grate 39 from the resilient platform 90 roll by gravity or scratching by the hens to the respective egg collector 28 adjacent to the second end 43 of the grate 39, which is in the direction of arrow A. Any eggs laid on the resilient platform 90 that do not roll to the cover 70, onto the grate 39, and to the egg collector 28, may be directed toward the egg collector 28 by the scratching of the hens. The egg collector 28 includes a conveyor 80 to carry the eggs from the aviary cage 21 to the collection area (not shown).

In the illustrated embodiment, the birds may defecate, lay an egg, drop feathers, and leave other deposits on the resilient platform 90. In one embodiment in which the hens walk, scratch, or land on the resilient platform 90, the resiliency of the resilient platform 90 limits the deposit from adhering to the resilient platform 90 by bouncing the deposit off of the resilient platform 90 as the birds move on the resilient platform 90. In one embodiment in which the fastening member is a spring 30, the spring loading of the resilient platform 90 limits the deposit from adhering to the resilient platform 90 by bouncing the deposit off of the resilient platform 90 as the birds move on the resilient platform 90.

In one embodiment, the resilient platform 90 bounces a deposit onto the cover 70 and/or onto the grate 39, which is in the direction of arrow B. The manure and other deposits small enough to pass through the openings (not shown) of the grate 39 and onto the belt 36 move in the direction of arrow C (shown in FIG. 4), to be carried by the belt 36 from the cage tower 18 to a collection area (not shown) positioned outside of the cage tower 18. Accordingly, the resilient platform 90 becomes relatively self-cleaning as the resiliency of the resilient platform 90 limits deposits from adhering to the resilient platform 90. By limiting adherence of deposits to the resilient platform 90, the ability of birds in the aviary to scratch deposits toward the grate 39 is enhanced. The action of birds in the aviary on the resilient platform 90 also facilitate the self-cleaning because the movement of the birds on the resilient platform 90 causes the resilient platform 90 to flex and then rebound or spring back into shape, which in turn causes some of the deposits on the resilient platform 90 to bounce onto the cover 70 and/or onto the grate 39 in the direction of arrow B.

It is common for the birds to peck and scratch the deposits away from the resilient platform 90. In one embodiment, the birds may scratch many of the deposits present on the resilient platform 90 onto the grate 39, which, depending on their size, may either pass through the openings (not shown) of the grate 39 and onto the belt 36 or roll or be scratched into the egg collector 28. Accordingly, the scratching of the deposits by the birds on the resilient platform 90 augments the self-cleaning features of the resilient platform 90.

The features of the present disclosure assist in the removal of large quantities of manure from the aviary. The removal of large quantities of manure reduces the amount of ammonia captured within the aviary, which is beneficial to bird and worker health. The features of the present disclosure facilitate automated cleaning of deposits from the aviary which, in turn, reduces the required frequency of manual cleaning of the aviary by workers.

While the embodiments have been illustrated and described in detail in the drawings and foregoing description, the same is to be considered as illustrative and not restrictive in character, it being understood that only certain embodiments have been shown and described and that all changes and modifications that come within the spirit of the embodiments are desired to be protected.

What is claimed is:

1. An aviary comprising:
   a cage comprising an outside surface;
   a perch exterior to the cage and spaced a first distance from the outside surface of the cage; and
   a resilient platform disposed exterior to the cage and adjacent to the perch, wherein a second distance from the resilient platform to the outside surface of the cage is less than the first distance, and wherein the resilient platform is resilient such that movement of a bird on the resilient platform causes the resilient platform to flex and then rebound to loosen a deposit from the resilient platform wherein the perch and the resilient platform are accessible to an animal within the cage; and
   wherein a gap is formed between the perch and the resilient platform, the gap is sized to capture eggs.

2. The aviary of claim 1, further comprising:
   an egg collector; and
   a cover positioned over the egg collector;
   wherein the egg collector extends from the outside surface of the cage.

3. The aviary of claim 1, further comprising:
   a support structure coupled to the outside surface;
   wherein the perch is coupled to the support structure.

4. The aviary of claim 3, further comprising:
   at least one fastening member.

5. The aviary of claim 4, wherein the at least one fastening member is attached to a first end of the resilient platform.

6. The aviary of claim 5, wherein the at least one fastening member comprises at least one device selected from the group consisting of: a brace, spring, rope, cable, wire, rod, beam, turnbuckle, eyebolt, hook, rivet, glue, weld, cord, and combinations thereof.

7. The aviary of claim 5, wherein the at least one fastening member comprises at least one spring.

8. The aviary of claim 1, wherein the resilient platform comprises a material selected from the group consisting of: plastic, metal, mesh, fiber, rubber, and combinations thereof.

9. The aviary of claim 3, further comprising:
   at least one bracket coupling the perch to the support structure;
   wherein the resilient platform is positioned over the at least one bracket and spaced apart from the at least one bracket.

10. The aviary of claim 9, wherein the perch is positioned at a greater height than the resilient platform.

11. The aviary of claim 1, further comprising:
    a grate, and
    a belt;
    wherein the grate is positioned inside the cage,
    further wherein the belt is positioned below the grate; and
    further wherein the resilient platform is positioned in a plane above the grate.

12. The aviary of claim 2, wherein the resilient platform is positioned adjacent the cover, and
    further wherein the resilient platform is sloped downward toward the cover.

13. The aviary of claim 3, wherein the support structure is spaced apart from the outside surface;
    further wherein the cover extends between the outside surface and the support structure; and
    further wherein the resilient platform is positioned adjacent to the cover.

14. The aviary of claim 1, further comprising:
    a resilient support structure,
    wherein the resilient platform is positioned over the resilient support structure.

15. The aviary of claim 1, further comprising:
    a first resilient fastening member; and
    a second resilient fastening member;
    wherein the resilient platform includes a first end and a second end;
    wherein the first resilient fastening member is attached to the first end; and
    wherein the second resilient fastening member is attached to the second end; and
    wherein the first and second resilient fastening members maintain the resilient platform in a planar orientation capable of supporting a bird.

16. The aviary of claim 1, further comprising:
    a first fastening member; and
    a second fastening member;
    wherein the resilient platform includes a first end and a second end;
    wherein the first fastening member is attached to the first end;
    wherein the second fastening member is attached to the second end; and
    wherein the first and second fastening members maintain the resilient platform in a planar orientation capable of supporting a bird.

17. The aviary cage of claim 1, wherein the resilient platform includes a scratching surface.

18. An aviary comprising:
    a cage;
    a resilient platform coupled to the cage, the resilient platform configured to bounce a deposit on the resilient platform to loosen the deposit from the resilient platform during movement of a bird on the resilient platform;

an egg collector;
a cover positioned over the egg collector;
a grate positioned inside the cage;
a perch positioned adjacent to the resilient platform;
wherein the cage comprises an outside surface,
further wherein the egg collector extends from the outside surface of the cage;
further wherein the cover is sloped toward the grate; and
further wherein the resilient platform is positioned adjacent to the cover and is sloped toward the cover wherein the perch and the resilient platform are accessible to an animal within the cage.

19. The aviary of claim 18, further comprising:
a first fastening member; and
a second fastening member;
wherein the resilient platform includes a first end and a second end;
wherein the first fastening member is attached to the first end;
wherein the second fastening member is attached to the second end; and
wherein the first and second fastening members maintain the resilient platform in a planar orientation capable of supporting a bird.

20. The aviary of claim 18, wherein the perch is positioned at a greater height than the resilient platform, wherein a gap is formed between the perch and the resilient platform, and further wherein the gap is sized to capture eggs.

* * * * *